No. 812,113. PATENTED FEB. 6, 1906.
E. M. CARD.
EYEGLASS MOUNTING.
APPLICATION FILED OCT. 6, 1905.

Witnesses
Wm. J. Koerth.
F. S. Elmore

Inventor
E. M. Card,
By Victor J. Evans
Attorney

UNITED STATES PATENT OFFICE.

EDWARD M. CARD, OF MIDDLEFIELD, CONNECTICUT.

EYEGLASS-MOUNTING.

No. 812,113.  Specification of Letters Patent.  Patented Feb. 6, 1906.

Application filed October 6, 1905. Serial No. 281,690.

*To all whom it may concern:*

Be it known that I, EDWARD M. CARD, a citizen of the United States, residing at Middlefield, in the county of Middlesex and State of Connecticut, have invented new and useful Improvements in Eyeglass-Mountings, of which the following is a specification.

This invention relates to an eyeglass-mounting, and has for its objects to produce a comparatively simple inexpensive device of this character which may be readily installed for use, one wherein the nose pieces or clamps may be conveniently adjusted to accord with the size of the nose of the wearer, and one wherein the pieces will without discomfort to the wearer maintain the glasses in proper position upon the nose.

With these and other objects in view the invention comprises the novel features of construction and combination of parts more fully hereinafter described.

Figure 1:
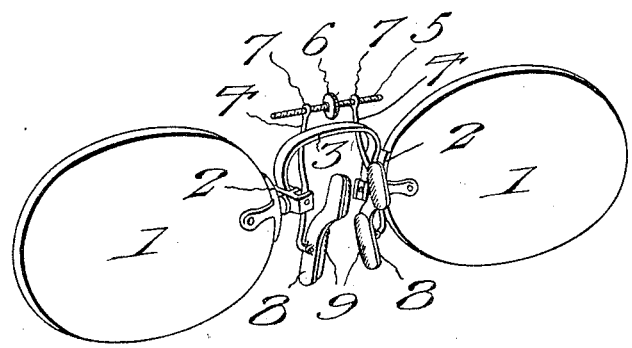
Figure 2:
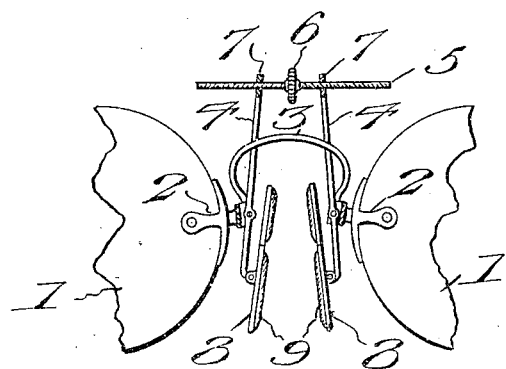

In the accompanying drawings, Figure 1 is a perspective view of a pair of eyeglasses equipped with a mounting embodying the invention. Fig. 2 is a rear elevation of the same.

Referring to the drawings, 1 1 designate the lenses secured in members or heads 2, connected by a spring-bow 3, terminally attached to the members 2, these parts, except as hereinafter explained, being all of the usual construction and material and adapted in practice to perform their ordinary functions.

Pivoted, respectively, to the heads 2 is a pair of movable members or levers 4, connected at their upper ends by an operating member or screw 5, having a central head or button 6, threaded through suitable bearings 7, provided on the levers 4, while carried by and pivoted, respectively, to the normally lower ends of the levers is a pair of coöperating nose pieces or clamps 8, suitably padded, as at 9, upon their inner active faces. It is to be observed that the operating member or screw 5 is threaded in relatively reverse directions on opposite sides of the head 6 and through the bearings 7, whereby rotation of the screw serves to move the upper ends on the levers 4 toward or from each other.

In practice the nose-pieces 8 engage the nose of the wearer as usual for holding the glasses in position and may be adjusted to fit the nose by properly manipulating the screw 5 for moving the upper ends of the levers 4 in the necessary direction either toward or from each other to thus move the nose pieces or clamps 8 to adjusted position, it being noted in this connection that owing to the nose-pieces being pivoted on the lower ends of the levers they will upon movement of the latter in turn move relatively to the levers for automatic relative adjustment to fit the nose.

From the foregoing it is apparent that I produce a simple device admirably adapted for the attainment of the ends in view, it being understood that minor changes in the details herein set forth may be resorted to without departing from the spirit of the invention.

Having thus fully described my invention, what I claim as new is—

1. In an eyeglass-mounting, lens-receiving heads, levers movably connected with the heads, nose-pieces carried respectively by the levers, and an operating member associated with and for moving the levers to adjust the nose-pieces relatively.

2. In an eyeglass-mounting, lens-receiving heads, a pair of levers pivoted between their ends respectively to the heads, nose-pieces carried by the levers, and an operating-screw connecting the levers and operable for moving the latter to adjust the nose-pieces relatively.

In testimony whereof I affix my signature in presence of two witnesses.

EDWARD M. CARD.

Witnesses:
 HUGH M. STERLING,
 D. W. GOULD.